United States Patent
Coulter

(10) Patent No.: US 10,871,311 B2
(45) Date of Patent: Dec. 22, 2020

(54) HEATING CASE FOR A PORTABLE ELECTRONIC DEVICE

(71) Applicant: Honeywell Federal Manufacturing & Technologies, LLC, Kansas City, MO (US)

(72) Inventor: Joshua Oliver Coulter, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 137 days.

(21) Appl. No.: 16/233,798

(22) Filed: Dec. 27, 2018

(65) Prior Publication Data

US 2019/0137145 A1 May 9, 2019

Related U.S. Application Data

(63) Continuation of application No. 14/961,570, filed on Dec. 7, 2015, now abandoned.

(51) Int. Cl.
| | |
|---|---|
| *F24V 30/00* | (2018.01) |
| *H04B 1/3888* | (2015.01) |
| *H04M 1/18* | (2006.01) |
| *G06F 1/16* | (2006.01) |
| *H04M 1/21* | (2006.01) |

(52) U.S. Cl.
CPC ............ *F24V 30/00* (2018.05); *G06F 1/1626* (2013.01); *G06F 1/1656* (2013.01); *H04B 1/3888* (2013.01); *H04M 1/185* (2013.01); *H04M 1/21* (2013.01)

(58) Field of Classification Search
CPC ...................................................... F24V 30/00
See application file for complete search history.

(56) References Cited

U.S. PATENT DOCUMENTS

| | | | | |
|---|---|---|---|---|
| 4,580,547 A | * | 4/1986 | Kapralis | A61F 7/03 126/263.03 |
| 6,484,514 B1 | * | 11/2002 | Joseph | B65D 81/3266 62/4 |
| 2010/0147737 A1 | * | 6/2010 | Richardson | B65D 81/022 206/701 |
| 2011/0089078 A1 | * | 4/2011 | Ziemba | A45C 13/02 206/570 |
| 2012/0085724 A1 | * | 4/2012 | Barker | F24V 30/00 215/11.2 |
| 2015/0270734 A1 | * | 9/2015 | Davison | H04B 1/1607 320/103 |

* cited by examiner

*Primary Examiner* — Jason Lau
(74) *Attorney, Agent, or Firm* — Hovey Williams LLP

(57) ABSTRACT

A case for an electronic device includes a housing for enclosing the electronic device and a removable heating device that may be placed in or on the housing for warming the electronic device without electricity from the electronic device. The removable heating device includes a pouch enclosing a supersaturated solution and a metal disk. The super saturated solution in the pouch undergoes an exothermic reaction when the disk is actuated.

16 Claims, 4 Drawing Sheets

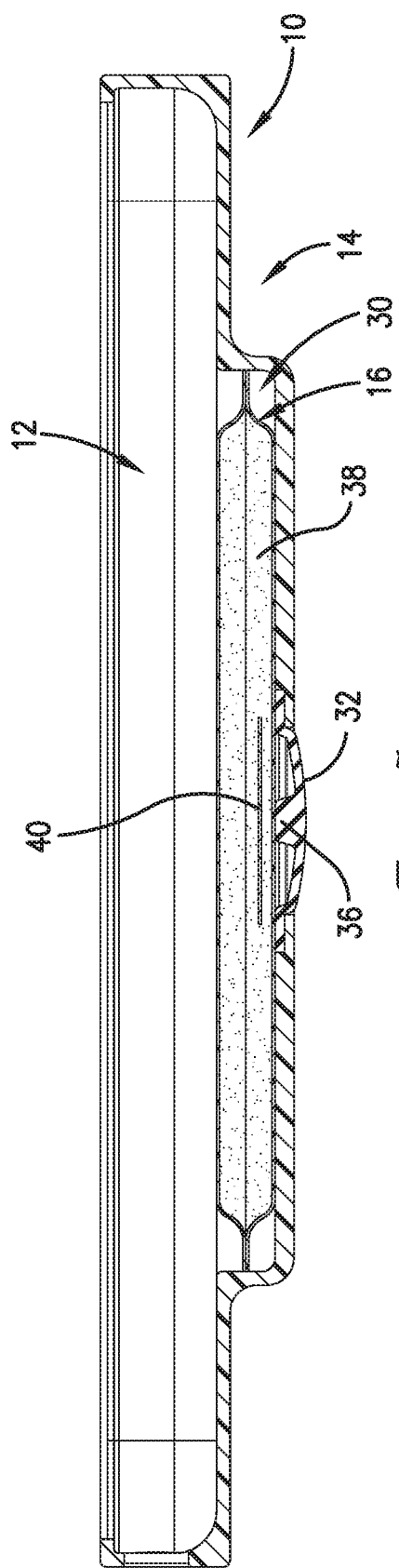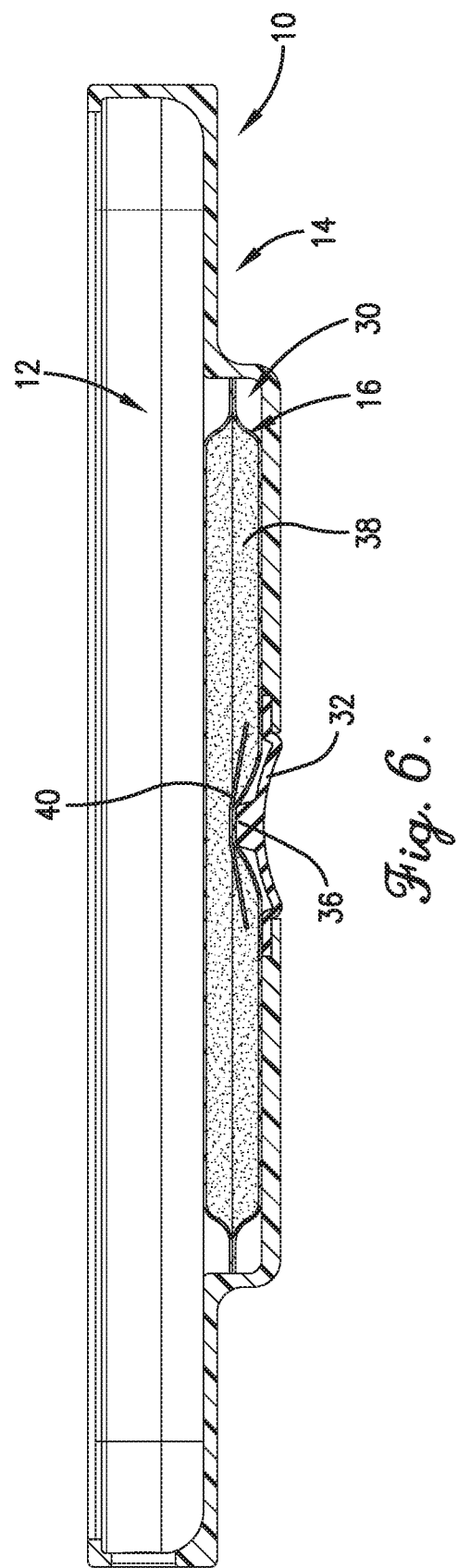

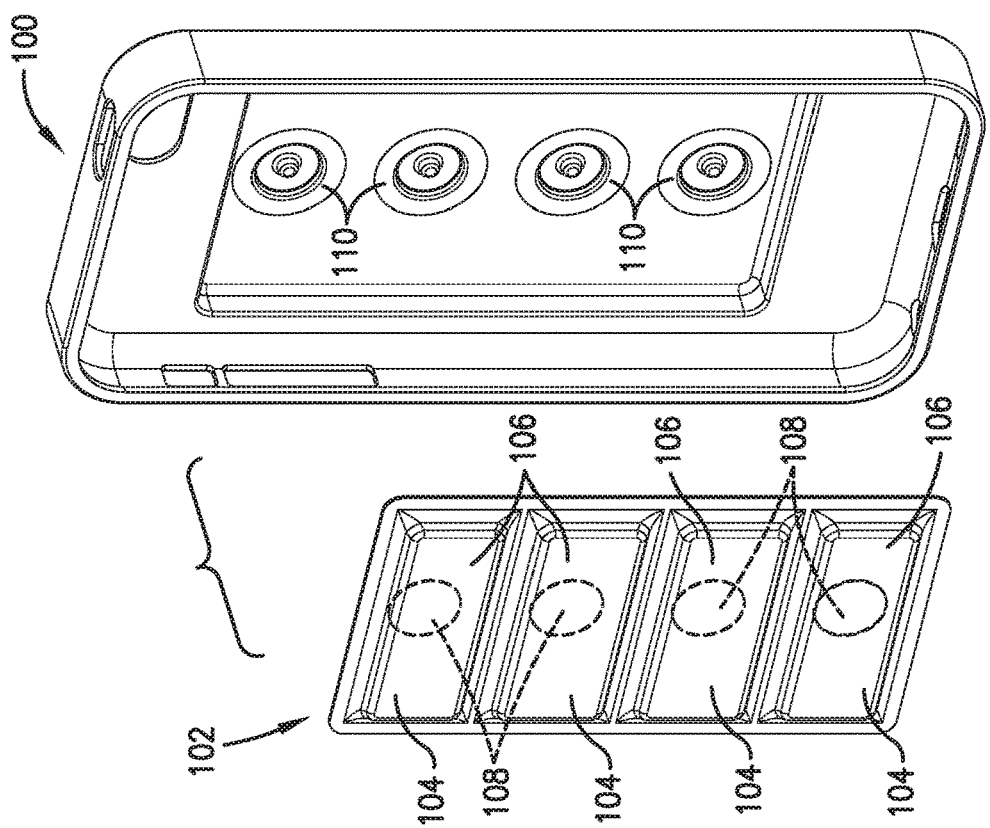

HEATING CASE FOR A PORTABLE ELECTRONIC DEVICE

RELATED APPLICATION

The present application is a continuation, and claims priority benefit with regard to all common subject matter, of earlier-filed U.S. patent application Ser. No. 14/961,570, filed on Dec. 7, 2015, and entitled "HEATING CASE FOR A PORTABLE ELECTRONIC DEVICE". The identified earlier-filed patent application is hereby incorporated by reference in its entirety into the present application.

STATEMENT REGARDING FEDERALLY-SPONSORED RESEARCH OR DEVELOPMENT

This invention was made with government support under Contract No.: DE-NA0000622 awarded by the Department of Energy. The government has certain rights in the invention.

BACKGROUND

Mobile phones and other portable electronic devices often fail to operate properly in cold temperatures. To alleviate this problem, some electronic devices have internal resistive-type electrical heating mechanisms, but such heating mechanisms quickly drain the devices' batteries. External resistive-type heating devices have also been developed to warm electronic devices, but such heating devices require batteries or other sources of electricity.

Accordingly, there is a need for an improved way to warm portable electronic devices when used in cold temperatures.

SUMMARY

The present invention solves the above-described problems and provides a distinct advance in the art of heating mechanisms for mobile phones and other portable electronic devices.

The present invention is a case for an electronic device that both protects the electronic device from damage and heats the electronic device when it is used in cold temperatures. One embodiment of the case broadly comprises a housing for partially or completely enclosing the electronic device and a removable heating device that may be placed in or on the housing for warming the electronic device. The heating device generates heat via an exothermic reaction when activated and does not require electricity from the electronic device or a supplementary battery.

An embodiment of the heating device comprises a pouch in which a supersaturated solution of sodium acetate, calcium nitrate, or other chemicals and a metal disk are enclosed. The supersaturated solution undergoes an exothermic reaction which generates heat when the metal disk is flexed or otherwise manipulated. After it used, the heating device may be removed from the case and "re-charged" by boiling it in water or otherwise exposing it to high heat for a period of time. Additionally, a spare heating device could be inserted in the housing after the initial heating device has expired.

The metal disk may be actuated in several ways. In one embodiment, the disk is actuated when a user manually presses or otherwise manipulates the disk. In another embodiment, the case may include a control device that automatically actuates the metal disk when the ambient temperature drops below a minimum threshold temperature. In yet another embodiment, the case may include a control device that actuates the metal disk upon receiving a triggering signal sent by the electronic device.

In another embodiment of the invention, the case includes a removable heating device with a pouch that is sub-divided into several separate compartments, with each compartment enclosing a volume of supersaturated solution of sodium acetate, calcium nitrate, or other chemicals and a metal disk. The supersaturated solution in each compartment undergoes an exothermic reaction and generates heat when the disk in that compartment is flexed or otherwise actuated. This embodiment allows the heating device to be used multiple times before it has to be removed from the case and re-charged and/or allows a user to activate a selected number of the compartments to provide a graduated level of warming. For example, a user may activate only one of the compartments when the electronic device is used at a first ambient temperature and may activate two or more of the compartments when the electronic device is used at a second, lower ambient temperature. Or, the user may actuate one compartment first, then another compartment an hour later, then another compartment an hour after that, and so on. This embodiment of the invention may also include a control device that actuates one or more of the disks when the ambient temperature drops below a minimum threshold temperature and/or upon receiving a triggering signal from the electronic device.

The heating case of the present invention provides numerous advantages. For example, by employing a heating device that generates heat via an exothermic reaction, the heating case may warm a mobile phone or other electronic device without draining the device's battery or requiring an additional battery. The heating device may also be repeatedly re-charged and re-used. Additionally, by providing a removeable heating device that is sub-divided into a number of separate compartments, a selected amount of heat may be provided and/or heat may be provided at selected time intervals.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 5 is a vertical sectional view of the heating case shown before or after the heating device has been manually activated.

FIG. 6 is a vertical sectional view of the heating case shown while the heating device is being manually activated.

FIG. 7 is an exploded front perspective view of a heating case constructed in accordance with an alternate embodiment of the invention.

FIG. 8 is an exploded rear perspective view of the heating case of FIG. 7.

Figure 1:
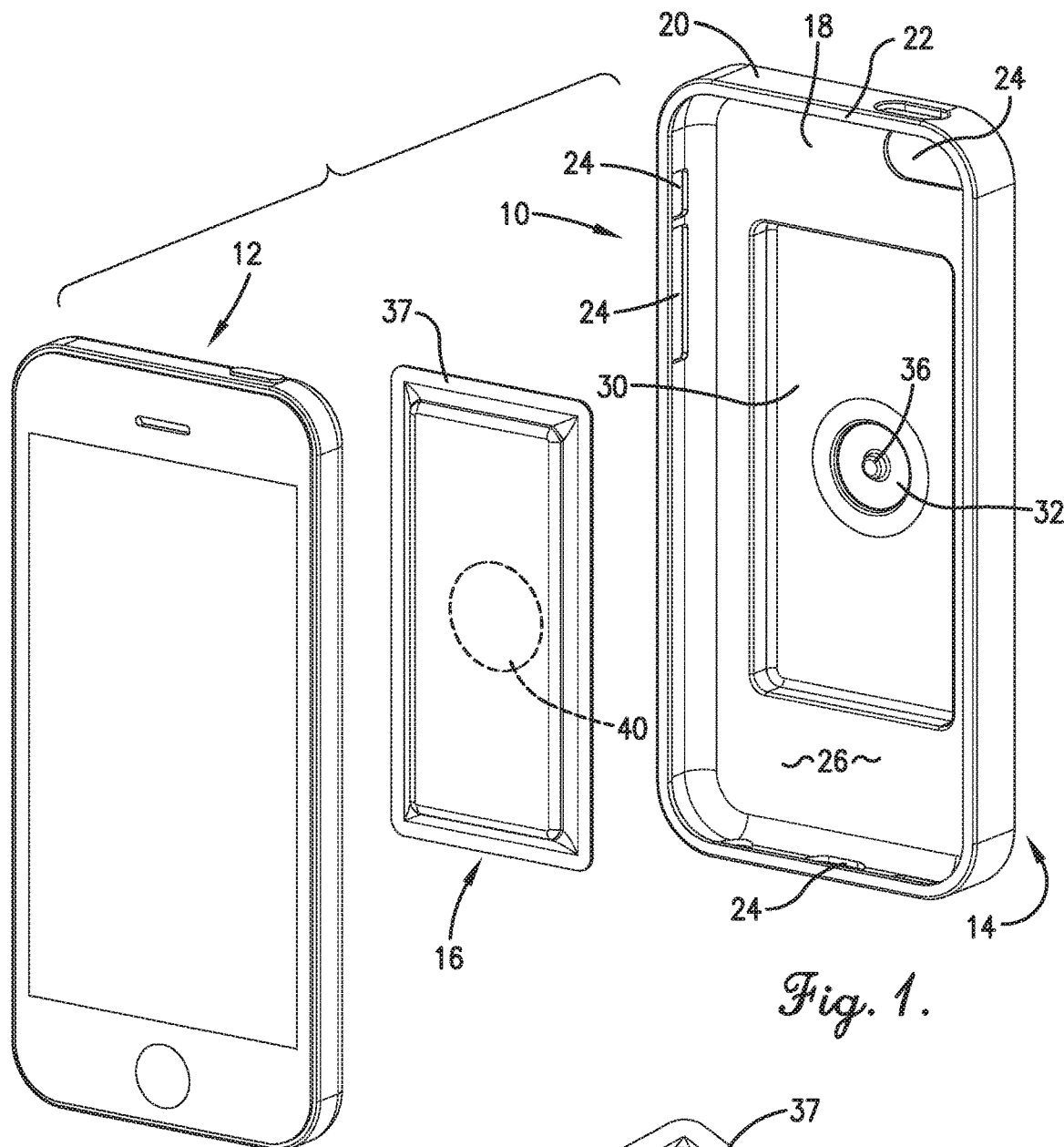
FIG. 1 is an exploded front perspective view of a heating case constructed in accordance with an embodiment of the invention and shown with a mobile phone to be enclosed in the heating case.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning now to the drawing figures, and initially FIG. 1, a heating case 10 constructed in accordance with an embodiment of the invention is shown with an exemplary portable electronic 12. The heating case 10 broadly comprises a housing 14 for partially or completely enclosing the electronic device 12 and a removable heating device 16 that may be placed in or on the housing 14 for warming the housing 14 and the enclosed electronic device 12 when the heating device 16 is activated.

Embodiments of the housing 14 will now be described in more detail. The housing 14 may be configured to fit any portable electronic device, including a mobile phone, a laptop computer, a portable navigation receiver, a tablet computer, etc. In one embodiment, the housing 14 is configured to fit an Apple iPhone® or a mobile phone made by RiMM®, Samsung®, HTC®, Motorola®, or Palm®. The housing 14 can also be configured to fit other types and versions of portable electronic devices without departing from the scope of the present invention.

The housing 14 may be formed as a single unitary component or may be constructed of several components that are attached together. One embodiment of the housing 14 comprises a generally rectangular shaped back plate 18 and a circumscribing sidewall 20 that extends upwardly from the back plate 18 to define a partially enclosed chamber for receiving the portable electronic device. An outer edge 22 of the sidewall 20 may be angled inwardly so as to form a lip that retains the electronic device 12 in the housing 14. The back plate 18 and the sidewall 20 may include a number of cut-outs 24, voids, etc. for providing access to the controls, cameras, and other components of the portable electronic device 12.

In one embodiment, the back plate 18 has an inner wall 26 (FIG. 1) and an outer wall 28 (FIG. 4) formed of different materials. The inner wall 26 is at least partially formed of a heat conductive material such as metal or ceramics so as to conduct heat from the removeable heating device 16 to the electronic device 12. The outer wall 28 is at least partially formed of an insulating material such as rubber or plastic so as to minimize heat loss from the heating case 10. In other embodiments, the back plate is formed of a single material, but the inner wall 26 may be lined with an insulating layer of material.

As best shown in FIGS. 1, 5, and 6, a recessed area 30 may be formed in the back plate 18 for receiving and supporting the removable heating device 16. The recessed area 30 may be of any shape and size to approximately match the shape and size of the removable heating device 16. Alternatively, a strap, velcro, adhesive strip, or other securement device may be positioned in or over the back plate for securing the heating device therein.

Figure 4:
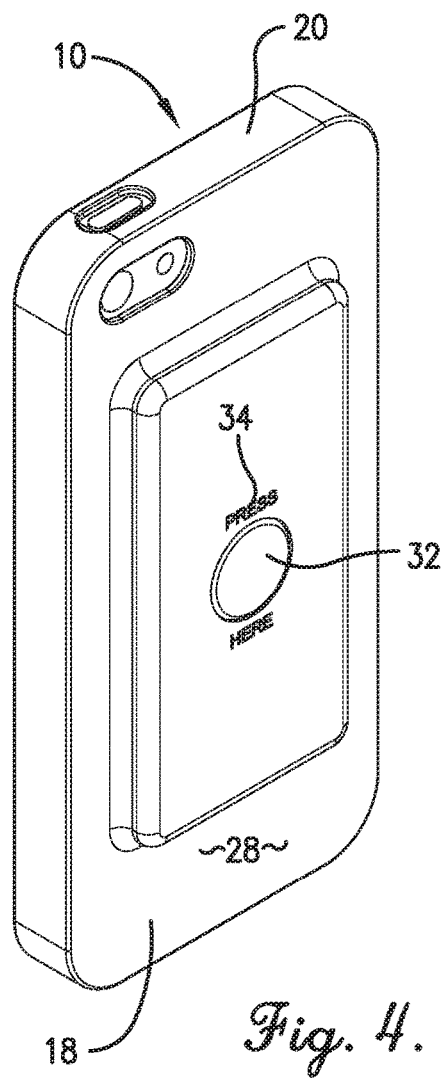
FIG. 4 is a rear perspective view of the heating case shown with a mobile phone installed therein.

As best shown in FIG. 4, the rear side of the housing may include a circular score line, crease, or other means to form a depressible button 32 that is aligned with the metal disk in the heating device. Markings 34 such as "press here" may be imprinted near the button 32. The inside of the button 32 may include a tab or other projection 36 as shown in FIG. 1, the purpose of which is described below.

Figure 2:
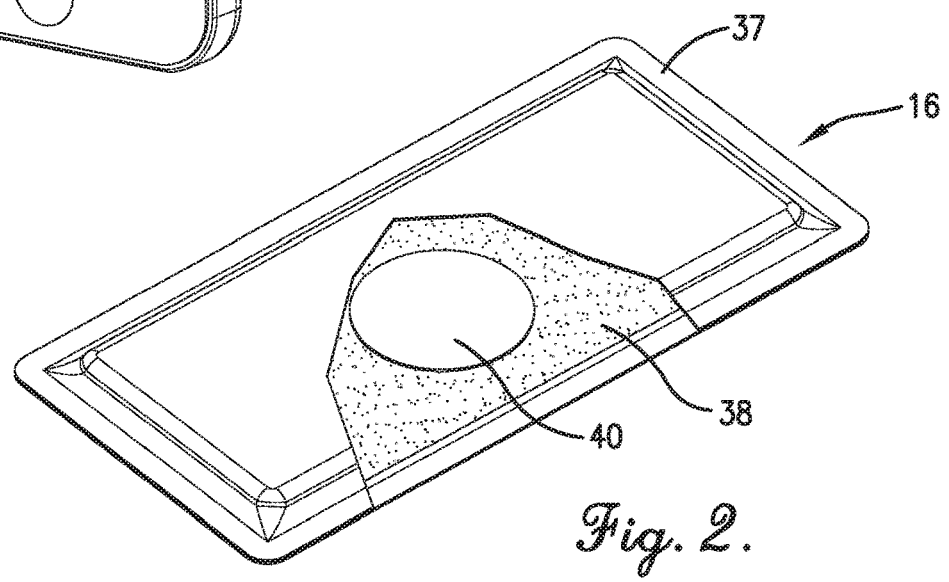
FIG. 2 is a perspective view of an embodiment of the removeable heating device shown removed from the heating case.
Figure 3:
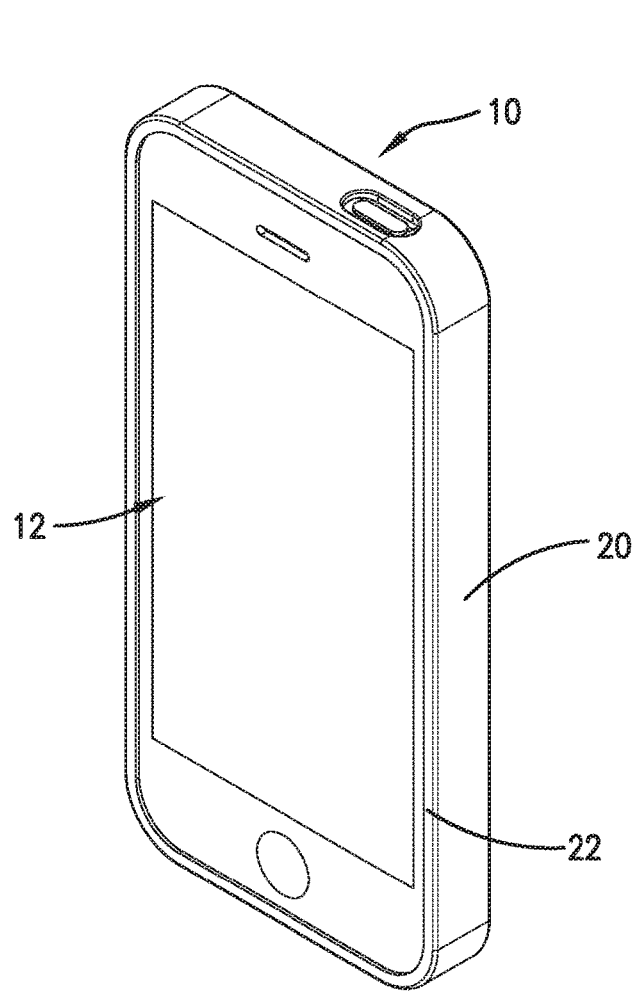
FIG. 3 is a front perspective view of the heating case shown with a mobile phone installed therein.

The removeable heating device 16 will now be described in more detail, primarily with reference to FIG. 2. An embodiment of the heating device 16 comprises a pouch 37 in which is enclosed a supersaturated solution 38 of sodium acetate, calcium nitrate, or other chemical dissolved in water. The pouch 36 also encloses a metal disk 40 that releases metal particles. The solution in the pouch undergoes an exothermic reaction which generates heat when the disk 40 is pressed or otherwise actuated. The exothermic reaction is the result of the process of crystallization, which is incited when the disk 40 releases particles into the solution. Snapping or pressing of the disk 40 releases its particles which then act as nucleation sites that allow for recrystallization of the remains of the sodium acetate solution or other chemical.

After it used, the heating device 16 may be removed from the housing 14 and "re-charged" by boiling it in water or otherwise exposing it to high heat. Boiling the heating device 16 redissolves the sodium acetate or other chemical in the water contained in the pouch and renews the supersaturated solution. When the heating device 16 has been cooled to room temperature, it can be placed back in the housing 14 and the above-described heating process can be repeated.

The metal disk 40 in the heating device 16 may be actuated in several ways to initiate the exothermic reaction. In one embodiment, the disk is actuated when a user manually presses or otherwise manipulates the disk. For example, as depicted in FIGS. 5 and 6, a user may press the button 32 to push the projection 36 against the disk 40 to bend or otherwise deform the disk.

Figure 9:
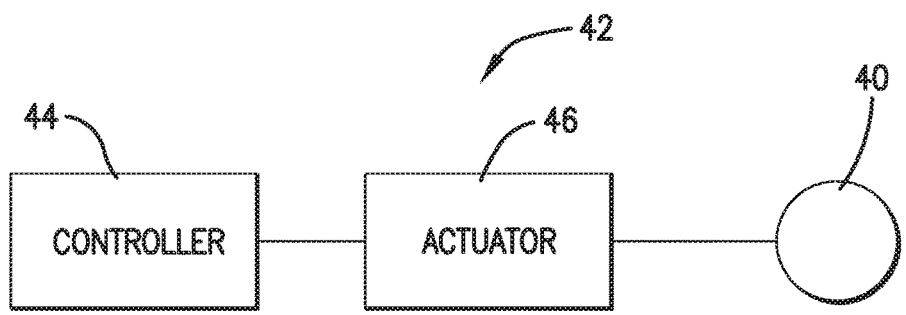
FIG. 9 is a block diagram of a control device that may be incorporated in any of the embodiments of the heating case.

In another embodiment, the case 10 may include a control device 42 illustrated in FIG. 9 for automatically actuating the metal disk 40. An embodiment of the control device 42 includes a controller 44 with an internal or external thermostat that triggers an actuator 46 when the ambient temperature drops below a minimum threshold temperature such as 40° F. The actuator 46 may include a small electrically activated plunger, switch, or other mechanism that pushes against the disk 40 when activated.

In another embodiment, the control device 42 may include a controller 44 that receives a wireless triggering signal sent by the electronic device 12 to trigger the actuator 46. The triggering signal may be generated by a software application stored on the portable electronic device 12. The software application may automatically send the triggering signal when the ambient temperature drops below a threshold temperature or may send the triggering signal when instructed to do so by a user of the electronic device.

The functions of the control device 42 may be implemented with one or more computer programs stored in or on computer-readable medium residing on or accessible by the controller 41 and/or the portable electronic device 12. Each computer program preferably comprises an ordered listing of executable instructions for implementing logical functions in the controller or portable electronic device. Each computer program can be embodied in any non-transitory computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any non-transitory means that can store the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

A heating case 100 constructed in accordance with another embodiment of the invention is illustrated in FIGS. 7 and 8. In this embodiment, the case 100 includes a removable heating device 102 which comprises a pouch with several separate compartments 104, with each compartment enclosing a supersaturated solution of sodium acetate, calcium nitrate, or other chemical 106 and a metal disk 108. As with the first embodiment of the invention, the solution in each compartment undergoes an exothermic reaction and generates heat when the disk in that compartment is actuated. This embodiment allows the heating device 102 to be used multiple times before it has to be removed from the case and re-charged and/or allows a user to activate a selected number of the compartments as needed. For example, a user may activate only one of the compartments when the ambient temperature is at a first level and may activate two or more of the compartments when the ambient temperature is at a second lower level.

The metal disks 108 in the pouch may be actuated in several ways. In one embodiment, the disks are actuated when a user manually presses or otherwise manipulates the disks. To facilitate this, the rear side of the housing may include several buttons 110 that are each aligned with one of the metal disks in the pouch. A user may press any of the buttons to deform the corresponding disk so as to release the crystals in the disk.

The metal disks 108 may also be actuated with the control device 42 illustrated in FIG. 9 in the same manner as discussed above. In one embodiment, the controller 44 and the actuator 46 are configured to actuate selected ones of the disks in a prescribed sequence. For example, the controller 44 may trigger the actuator 46 to press against only some of the disks when the ambient temperature drops below a minimum threshold temperature such as 40° F. The controller may be programmed to activate the metal disks sequentially over a time period to maintain a relatively steady temperature in the housing. For example, the controller may activate a first metal disk when the ambient temperature drops below a threshold temperature such as 40° F. and may then activate another metal disk 30 minutes later if the ambient temperature remains below 40° F., and another metal disk 30 minutes after that, and so on until all of the disks have ben activated.

The controller 44 may also trigger the actuator 46 to activate a selected number of the disks 108 depending on the ambient temperature. For example, the controller 44 may activate only one metal disk 108 when the ambient temperature drops below 40° F., two of the disks when the ambient temperature drops below 30° F., three of the metal disks when the temperature drops below 20° F., and all of the metal disks when the ambient temperature drops below 10° F. The controller 44 may also receive a wireless triggering signal sent by the electronic device 12 to trigger the actuator. The triggering signal may be generated by a software application stored on the portable electronic device 12. The software application may automatically send triggering signals when the ambient temperature drops below a threshold temperature in the same sequences as described above or may send the triggering signals when instructed to do so by a user of the electronic device 12.

Although the invention has been described with reference to the preferred embodiment illustrated in the attached drawing figures, it is noted that equivalents may be employed and substitutions made herein without departing from the scope of the invention as recited in the claims. For example, the particular temperature valves, time intervals, and other parameters described herein may be changed without departing from the scope of the invention. Additionally, any chemical that may undergo an endothermic reaction may be used in the pouch.

Having thus described the preferred embodiment of the invention, what is claimed as new and desired to be protected by Letters Patent includes the following:

The invention claimed is:

1. A case for an electronic device, the case comprising:
a housing for at least partially enclosing the electronic device;
a removable heating device configured to be placed in or on the housing for warming the electronic device without electricity from the electronic device, the heating device including a pouch enclosing a metal disk and a chemical that generates heat via an exothermic reaction when the metal disk is actuated; and
a control device configured to actuate the metal disk upon receiving a triggering signal from the electronic device, the control device including an electrically-activated plunger operable to push against the metal disk.

2. The case as set forth in claim 1, the chemical being a supersaturated solution.

3. The case as set forth in claim 1, the metal disk being additionally actuatable via a user of the case pressing the metal disk.

4. The case as set forth in claim 1, the housing including a back plate having an inner wall and an outer wall.

5. The case as set forth in claim 4, the housing further including a circumscribing sidewall that extends from the inner wall to define a partially enclosed chamber for receiving the electronic device.

6. The case as set forth in claim 4, the inner wall of the back plate being at least partially formed of a heat conductive material so as to conduct heat from the removable heating device to the electronic device.

7. The case as set forth in claim 4, the outer wall of the back plate being at least partially formed of an insulating material so as to minimize heat loss from the case.

8. The case as set forth in claim 5, the sidewall including a cut-out for providing access to a component of the electronic device.

9. The case as set forth in claim 4, the back plate including a recessed area for receiving and supporting the removable heating device.

10. The case as set forth in claim 1, the triggering signal being a wireless signal.

11. The case as set forth in claim 1, the chemical including at least one of sodium acetate, calcium nitrate, and water.

12. A case for an electronic device, the case comprising:
    a housing for enclosing the electronic device, the housing including a back plate having an inner wall, an outer wall, and a recessed region; and
    a circumscribing sidewall extending generally perpendicularly from the back plate to define a chamber for receiving the electronic device;
    a removable heating device configured to be placed in the recessed region of the back plate for warming the electronic device without electricity from the electronic device, the heating device including a pouch enclosing a metal disk and a chemical that generates heat via an exothermic reaction when the metal disk is actuated; and
    a control device that actuates the metal disk upon receiving a triggering signal from the electronic device, the control device including an electrically-activated plunger for actuating the metal disk.

13. The case as set forth in claim 12, the inner wall of the back plate being at least partially formed of a heat conductive material so as to conduct heat from the heating device to the electronic device and wherein the outer wall of the back plate is at least partially formed of an insulating material so as to minimize heat loss from the protective case.

14. The case as set forth in claim 12, the sidewall including a plurality of cut-outs for providing access to components of the electronic device.

15. The case as set forth in claim 12, the metal disk being additionally actuatable via a user of the protective case pressing the outer wall of the back plate of the housing.

16. A case for an electronic device, the case comprising:
    a housing for enclosing the electronic device, the housing including a back plate having an inner wall, an outer wall, and a recessed region, the inner wall being at least partially formed of a heat conductive material for conducting heat to the electronic device, the outer wall being at least partially formed of an insulating material so as to minimize heat loss from the protective case; and
    a circumscribing sidewall extending generally perpendicularly from the back plate to define a chamber for receiving the electronic device, the sidewall including a plurality of cut-outs for providing access to components of the electronic device;
    a removable heating device configured to be placed in the recessed region of the back plate for warming the electronic device without electricity from the electronic device, the heating device including a pouch enclosing a metal disk and a chemical that generates heat via an exothermic reaction when the metal disk is actuated; and
    a control device having an electrically-activated plunger configured to actuate the metal disk upon the control device receiving a triggering signal from the electronic device, the metal disk being additionally actuatable via a user pressing the outer wall of the back plate of the housing.

* * * * *